(12) United States Patent
Gallagher et al.

(10) Patent No.: US 11,496,312 B2
(45) Date of Patent: Nov. 8, 2022

(54) COLLECTING SURVEYS WITH SECURE IDENTITIES VIA A BLOCKCHAIN

(71) Applicant: Insights Network, Georgetown (KY)

(72) Inventors: Brian R. Gallagher, Georgetown (KY); Darwin R. Lo, Georgetown (KY)

(73) Assignee: Insights Network, Georgetown (KY)

( * ) Notice: Subject to any disclaimer, the term of this patent is extended or adjusted under 35 U.S.C. 154(b) by 0 days.

(21) Appl. No.: 17/741,399

(22) Filed: May 10, 2022

(65) Prior Publication Data

US 2022/0271937 A1    Aug. 25, 2022

Related U.S. Application Data

(63) Continuation of application No. 16/716,863, filed on Dec. 17, 2019, now Pat. No. 11,329,825.

(60) Provisional application No. 62/780,760, filed on Dec. 17, 2018.

(51) Int. Cl.
| | |
|---|---|
| *H04L 29/06* | (2006.01) |
| *H04L 9/32* | (2006.01) |
| *H04L 9/06* | (2006.01) |
| *G06Q 30/02* | (2012.01) |
| *G06Q 30/08* | (2012.01) |
| *H04L 9/00* | (2022.01) |

(52) U.S. Cl.
CPC ....... *H04L 9/3218* (2013.01); *G06Q 30/0217* (2013.01); *G06Q 30/0226* (2013.01); *G06Q 30/08* (2013.01); *H04L 9/0637* (2013.01); *H04L 9/3239* (2013.01); *G06Q 2220/00* (2013.01); *H04L 9/008* (2013.01); *H04L 9/50* (2022.05); *H04L 2209/466* (2013.01)

(58) Field of Classification Search
None
See application file for complete search history.

(56) References Cited

U.S. PATENT DOCUMENTS

| | | | |
|---|---|---|---|
| 2017/0019496 A1* | 1/2017 | Orbach | G06Q 30/0241 |
| 2017/0358041 A1* | 12/2017 | Forbes, Jr. | G06Q 20/02 |
| 2019/0229890 A1 | 7/2019 | Brehmer et al. | |
| 2020/0076602 A1 | 3/2020 | Redpath et al. | |
| 2020/0153624 A1 | 5/2020 | Wentz et al. | |
| 2021/0342836 A1* | 11/2021 | Celia | G06N 3/049 |

FOREIGN PATENT DOCUMENTS

DE    102018115350 A1    1/2020

* cited by examiner

*Primary Examiner* — Andrew J Steinle
(74) *Attorney, Agent, or Firm* — Blank Rome LLP

(57) ABSTRACT

Collecting surveys with a secure identity is described. A request (i) pertaining to a survey and (ii) targeted to an attribute of a user is posted from a requesting system to a blockchain. It is determined, via the blockchain, that a user profile includes an attribute that matches with the attribute of the request. The request to a device associated with the user profile is transmitted via the blockchain and in response to determining that the user profile includes the attribute that matches with the attribute of the request. A response to the request is received from the device associated with the user profile. A commitment based on the response to the request is generated to the blockchain. The commitment is transmitted from the blockchain to the requesting system.

21 Claims, 5 Drawing Sheets

COLLECTING SURVEYS WITH SECURE IDENTITIES VIA A BLOCKCHAIN

CROSS REFERENCE TO RELATED APPLICATIONS

This application is a continuation of U.S. application Ser. No. 16/716,863, filed Dec. 17, 2019, and issued as U.S. Pat. No. 11,329,825 on May 10, 2022, which claims the benefit of U.S. Provisional Patent App. No. 62/780,760, filed Dec. 17, 2018, the disclosures of which are incorporated herewith by reference in their entirety.

TECHNICAL FIELD

The present disclosure relates to a decentralized network where authenticated participants interact peer-to-peer by exchanging data via a blockchain.

BACKGROUND

Organizations (e.g., data brokers) collect data about individuals from a wide array of sources, both online and offline. For example, they may purchase data from Internet services and mobile applications (apps) that collect information on their users and track their in-app behavior. The data can then be packaged into profiles for individual users, which they sell to organizations who can use them to make decisions that impact the users' lives without the users being aware of such decisions.

Data brokers have thousands of pieces of information on each of more than hundreds of millions of people. These data brokers are able to combine all the information they have on each individual to generate in-depth user behavior reports across a wide range of industries. But the users, who are actually driving the industry, do not share in associated profits and may actually suffer from security breaches at the data brokers. For example, centrally managed databases allow hackers to steal personally identifying information, which often leads to identity theft and other fraud. There is thus a need for techniques that validate users and secure data while allowing the data to be monetized by those who generate and thus rightfully own the data.

SUMMARY

Systems and methods are disclosed for validating a user identity on a blockchain and for subsequent data exchange using the blockchain. In some embodiments, a device having a user whose identity is authenticated or validated may be used for exchanging, via the blockchain, data with at least systems requesting such data. The exchanged data may relate to confidential data, i.e., that a user wants to protect when sharing and that another user or system can trust. Some embodiments may thus control data access in the exchange. Accordingly, one or more aspects of the present disclosure relate to a method for: obtaining, by the client device, first data related to a commitment being made by a user, the first data being partly based on information identificatory or characteristic of the user; sending, by the client device to a verification system, the first data; verifying, by the verification system, that the first data corresponds with second data generated using identification documentation of the user; and posting, by the verification system, data representing the commitment to a blockchain, responsive to a successful verification. The method is implemented by one or more hardware processors configured by machine-readable instructions and/or other components.

Yet another aspect of the present disclosure relates to a system configured for authenticating user identity. The system comprises one or more processors and other components or media, e.g., upon which relevant machine-readable instructions may be executed. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure. Like reference numerals may refer to like elements throughout the specification.

DETAILED DESCRIPTION

Presently disclosed are systems and methods of using decentralized storage, a digital currency, and smart contracts to create a decentralized, incentivized platform. This approach may be applicable to a wide variety of scenarios (e.g., market research, secure storage of user data, etc.). In some embodiments, system users may make requests for data from precisely defined populations (e.g., particular members or data providers of the disclosed network or system). Disclosed embodiments improve over traditional systems that include data brokers, since the data providers may be confident about their privacy (e.g., via distributed cryptography) and may sell their own data.

Figure 1:
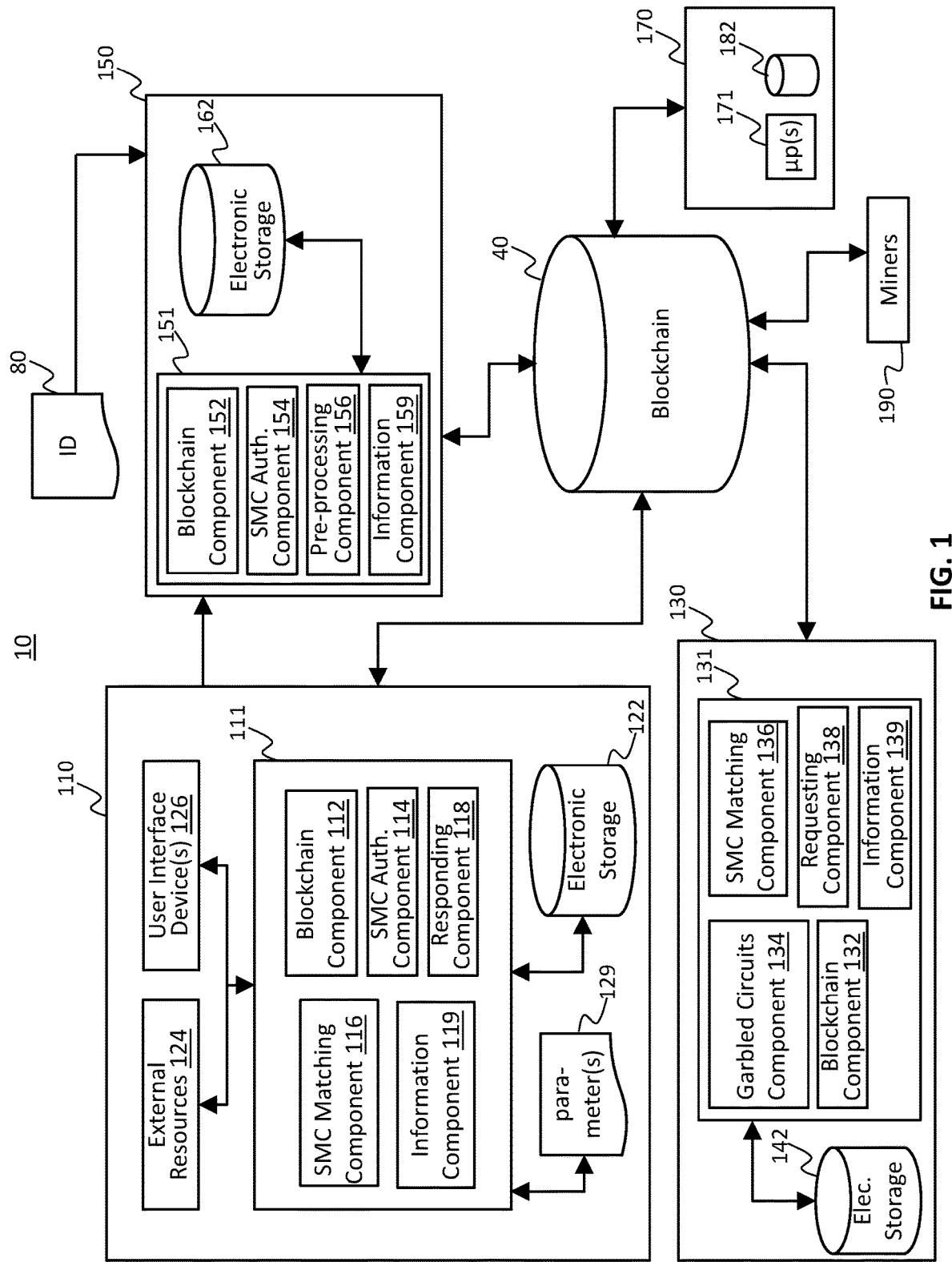
FIG. 1 is a schematic illustration of a system configured for validating user identities and for exchanging data on a blockchain, in accordance with one or more embodiments.

FIG. 1 illustrates system 10 configured to post commitments to a blockchain. As used herein, posting a value into a blockchain may also be described as sending, putting, publishing, submitting, recording, adding, writing, and committing.

Some disclosed embodiments may use smart contracts that execute transactions between anonymous parties, users being thus able to sell their data without disclosing their identity. Instead, these users may only disclose one or more demographic details to which they have committed. A unique combination of a blockchain and secure multiparty computation (SMC) makes it possible to enforce the exchange of data and payment between requesters and providers of data without third-party involvement. While a blockchain makes the exchange transparent, SMC secures data (e.g., personally identifying information) until an agreement has been reached and payment has been made.

A blockchain may be described as a decentralized system, decentralization meaning that the network operates on a user-to-user (or peer-to-peer) basis. Decentralizing file storage on the Internet leads at least to the benefit of not having a single point of failure. By storing blocks of information that are identical across its network, the blockchain cannot be controlled by any single entity. From a simplistic viewpoint, distributing data throughout the network protects it from getting hacked or lost. The blockchain technology thus inherently guarantees the validity of a transaction by recording it not only on a main register or ledger but on a connected, distributed system of registers or ledgers, all of which are connected through a secure validation mechanism.

Traditionally, copies of a document are shared, and no two or more users can make edits to the document at a same time. In a blockchain, parties of a transaction have access to a same document at a same time, and a single version of that document is always visible to the parties (e.g., nodes of the blockchain network).

Figure 2:
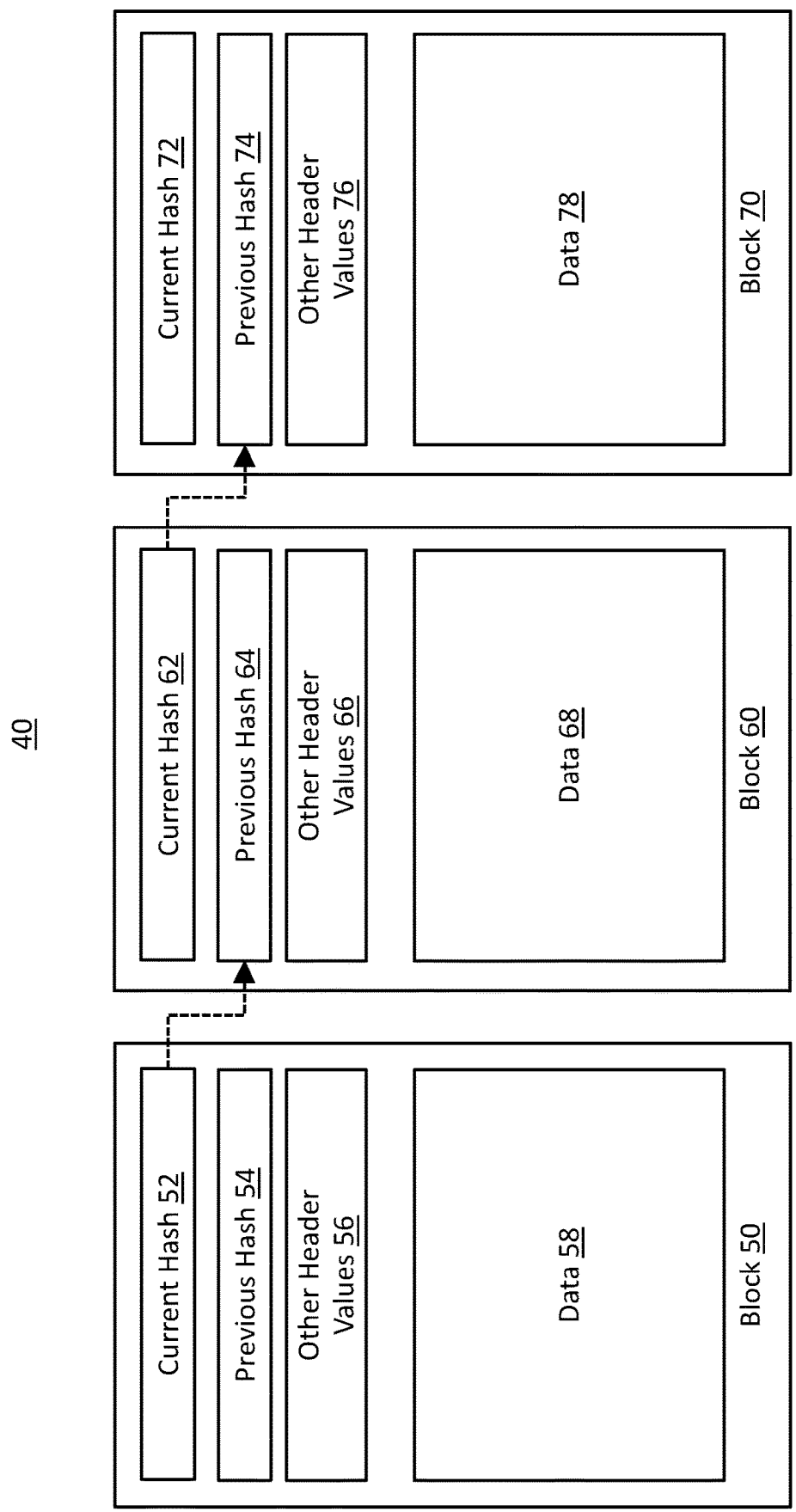
FIG. 2 illustrates an exemplary blockchain, in accordance with one or more embodiments.
Figure 5:
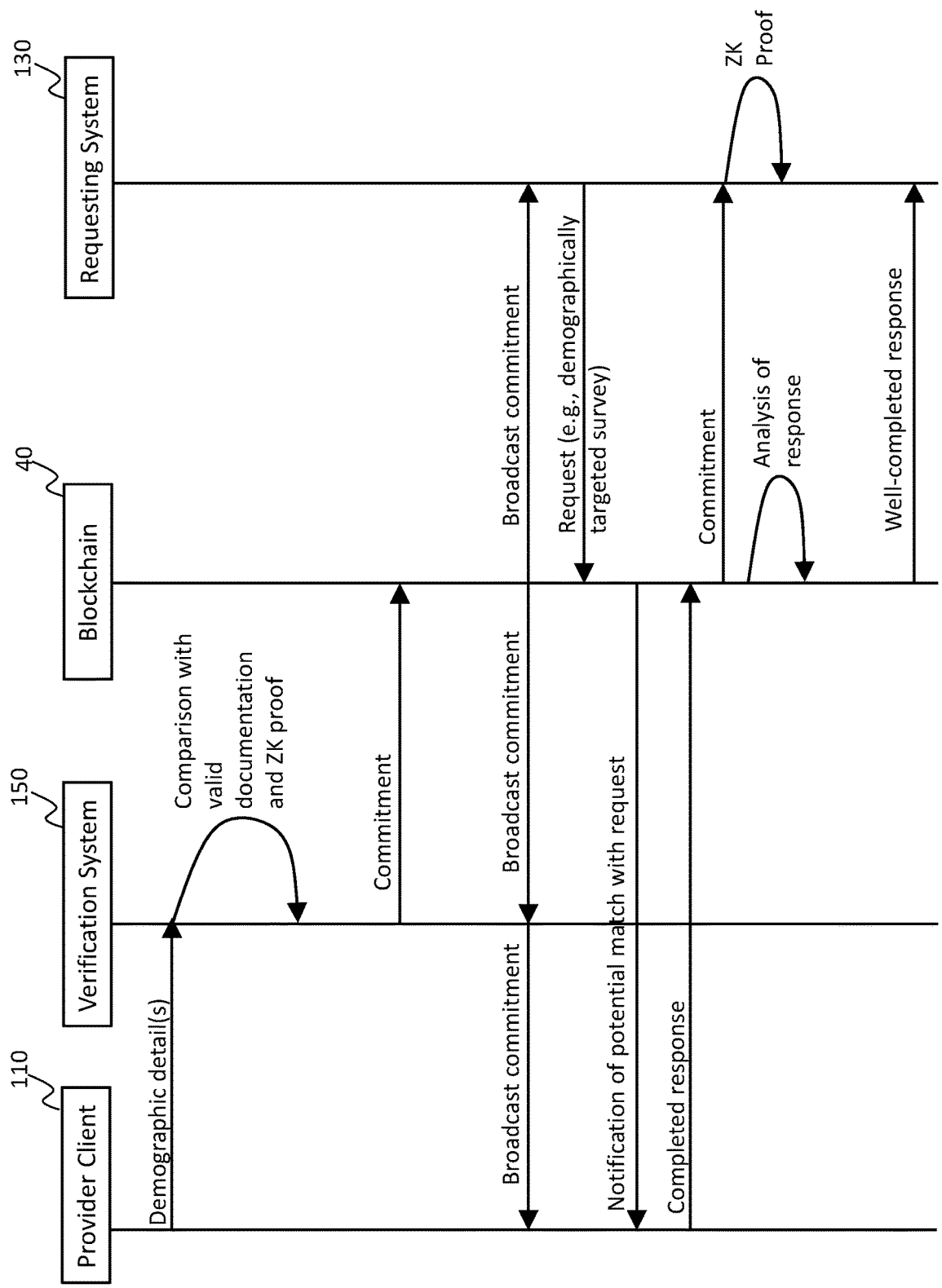
FIG. 5 depicts a sequence diagram of some exemplary operations performed by some components of the system, in accordance with one or more embodiments.

Blockchain 40, depicted in FIGS. 1-2 and 5, shares memory, e.g., comprising records of previously made profile value commitments, account information, and/or other blockchain data values. The blockchain is then a set of protocols and cryptographic methods that enable a network of computing devices to work together to securely record data with a shared, open database. This database may comprise a series of encrypted blocks that contain the data. The distributed, blockchain 40 may record basic attributes of each transaction. Distributed ledgers further enable the coding of simple contracts (e.g., smart contracts) that will execute when specified conditions are met. A smart contract is a transaction stored on a blockchain that can be executed (e.g., self-executing code).

The disclosed approach improves upon existing systems by allowing participants to profit from their participation such that organizations will acquire data that is both more relevant and more actionable. At least two types of users are thus served by the presently disclosed approach: those who request data, requesters 130, and those who provide it, providers 110. Requester 130 may be a user of any type of device or an organization that may use more powerful devices. Providers 110, who fit data requesters' target criteria (e.g., demographics or other characterizing information), may be compensated for their data, e.g., in tokens. With a wallet a user of the network can know how many tokens they have rights to in the blockchain. Tokens are units of value recorded on blockchain 40 and may contain any kind of value.

In some embodiments, provider 110 may be one of many different provider (client) devices. Similarly, in some embodiments, requester 130 may be one of many different requester systems. Similarly, in some embodiments, verifier 150 may be one of many different verification systems. In some embodiments, verifier 150 may be a trusted, verification partner of system 10.

In some embodiments, requester 130 may want to be able to collect data that is relevant, trustworthy, timely, and/or convenient. Data may be considered relevant if it is from provider 110 that fits a given population or demographic (e.g., aged between 20 to 35). Collected data may be considered trustworthy if it is free from fraud, true/honest, and/or received from a genuine person rather than a bot. Data may be considered timely, if providers 110 provide answers to questions immediately responsive to a request received from requester 130, and it may be considered convenient when requester 130 does not have to determine a manner in which it can reach its target.

In some embodiments, providers 110 may want some assurances in return for relinquishing their privacy and engaging in potentially tedious question answering. Data may be relinquished, in some implementations, by the express consent of provider 110. Instead of or in addition to these assurances, provider 110 may only relinquish general or generic demographic detail(s) rather than personally identifying or other, more-sensitive information. Further, provider 110 may be paid for the data they provide, and in these or other implementations, the provided data may be secured (e.g., via cryptography). In some embodiments, providers preserve their anonymity while participating in system 10. Via the disclosed SMC, requesters may be assured that, even though they are anonymous, the providers who are fulfilling their data requests are real people who are being honest about their profile or other committed-to characteristic(s).

Some implementations of disclosed embodiments may resolve the asymmetric information problem, by thoroughly profiling individuals and companies. For example, in finance, lenders typically know less about the borrower's ability to pay back the loan than the borrower. This may result in higher interest rates to an otherwise low risk borrower to compensate for the lack of information, which manifests as average expected risk. This problem may be resolved by the these parties' participation in the blockchain network, due to the built-in incentives and/or other encouragement for more information to be disclosed. Disclosed embodiments may thus profile many more individuals and companies than is otherwise performed, resulting, in the foregoing example, in a better separation between untrustworthy and trustworthy data providers.

In another exemplary implementation, an insurance company may remedy their insufficient profile information about an insured party by engaging this party in the disclosed system. Another example is product differentiation, where the supplier lacks information about the customers' preferences in order to define the most suitable menu of products or contracts. One example of the latter could be the problem of designing the right menu of mobile subscriptions with respect to price, data, or other features. Disclosed embodiments may thus provide a platform that empowers an individual person or company to collaborate on equal terms with, e.g., banks, insurance companies, and/or other institutions to address the asymmetric information problem.

Some embodiments of the disclosed approach may generally support user authentication (e.g., using some profile data), decentralized data brokerage, requests (e.g., surveys), and two-sided rating (e.g., provider rates the requester and vice versa). The decentralized data exchange of disclosed embodiments between providers and requesters, without any third-party involvement, may comprise one or more of a matching process (e.g., providers' profiles with the requester's demand), a secure data transfer, and a secure payment. The data to be transferred may include survey data, which may include relevant background information (e.g., demographics to be matched) and user-supplied answers to the survey or questionnaire.

In some embodiments, any node of system 10 can publish a request to the blockchain. For example, requester 130 or even provider 110 may submit requests. In some embodiments, a requester can submit the request to a smart contract by paying a nominal amount of tokens. The requester may specify one or more target individuals and how many tokens each of the target individuals will receive when they submit a valid response. In some embodiments, the request may include an amount of tokens to be held in escrow for the smart contract to pay out to qualified providers (i.e., those who have submitted valid data points and profile data values that match the requester's target). For additional security, since a large number of tokens could be involved, the requester may stipulate in some embodiments that each request be approved by multiple parties from their organization using a suitable permission system (e.g., of the blockchain operating system (OS)). At requester 130's discretion, the data points of a data request could be recorded in blockchain 40 for anyone to inspect. Providers 110 may then fulfil the request by providing information to an SMC. Once a requester is satisfied with the data points they have received from blockchain 40, the requester may optionally close out the data request such that any tokens remaining in escrow are returned to requester 130's account.

In some embodiments, a device of provider 110 may be of any type. Software running on this device may be managed by a Mac OS, Windows OS, Linux OS, Android OS, iOS, or other suitable OS. In some embodiments, verifier 150 and authenticator 170 may be servers running SMC instances and hence having a restricted code base. For example, a set of used libraries may be minimal. Since the verification and authentication systems may participate in the authentication based only on their existing data, they may act more as a gateway/API to the existing data. By comparison, in some embodiments, requester 130 may be more complete and self-contained. Requester 130 may store the questionnaires and survey criteria, e.g., in storage 142. In some embodiments, requester 130 may store (e.g., in database stored in storage 142) encryption keys for each participating provider. In some embodiments, the verification, authentication, and requesting systems may use Java, and in these or other embodiments, the provider client devices may use Java. Some of the libraries used by these devices and/or systems may be constrained to jersey and hibernate, the latter being used for storage in requester 130.

Since blockchain 40 may, in some implementations, be an open ledger, anyone inspecting these records would have reasonable assurance that the data points have not been tampered. This feature is significant for various reasons and for various applications, e.g., polling, voting, or other type of questionnaire. In some embodiments, the data can be encrypted using informationally-theoretically secure encryption on the blockchain. As long as there are enough independent, protocol-abiding nodes in the network, the ledger is tamper-proof.

The blockchain and the herein described protocol for performing a secure multiparty computation (SMC) are trustless, i.e., removing the need to entrust a centralized, third party. The blockchain provides transparency, while SMC provides privacy. Some embodiments may be built using the EOS.IO blockchain protocol or via Ethereum. EOS.IO operates as a smart contract platform and decentralized operating system (OS), and it may implement a suitable algorithm for generating new blocks to achieve a very high transaction throughput (e.g., greater than that of either the Bitcoin or Ethereum blockchains).

Some embodiments may leverage EOS.IO technology by (i) allocating resources (e.g., transaction bandwidth) to each account according to a number of tokens held by that account, (ii) upgrading smart contracts (dApps) to introduce new features and fix bugs, and/or (iii) allowing compromised (i.e., not secure) accounts to be recovered with the help of a designated account, if they provide identity documentation and multi-factor authentication. In some embodiments, a user of the blockchain network may not have to pay each time they use an app, and they may be provided guaranteed transaction bandwidth across the network without disruptions caused by other activity occurring on the blockchain (i.e., rate limiting).

Some embodiments may leverage EOS.IO technology by requiring users of system 10 to receive approval by one or more other parties prior to executing certain operations. For example, a data request may require the approval of several people within the requester's organization (i.e., multi-user control). In these or other embodiments, system 10 may add a delay before sensitive transactions are recorded in the blockchain, which is when they become irreversible. During this waiting period, users may be notified by electronic communication (e.g., email, text message, etc.) that the transaction (e.g., a data request that would require payment of a certain amount of tokens) is occurring, and they are given a chance to cancel it if they did not authorize it.

In addition to keeping records of transactions between accounts, blockchains are also capable of keeping records of changes to the state of a program (e.g., the smart contract or decentralized app) hosted on the blockchain. For example, some embodiments of system 10 may (i) log activities, (ii) assemble an output of an SMC, and/or (iii) transfer tokens between accounts.

SMC enables computation with respect to unknown data. Some embodiments of the SMC may convert the computation into a distributed computation. That is, no participant of the computation may see a full input, rather only a derivation of it, which does not on its own give information about the full input.

SMC may facilitate certain techniques, such as zkSNARK and homomorphic encryption. SMC is not a single protocol but a growing class of solutions, each with different characteristics. In some embodiments, each node of system 10 may be, in certain instances, a computing party, an input party, or a result party. Computing parties may be responsible for carrying out a distributed computation, input parties may take inputs for a computation that should be kept confidential (e.g., secret sharing or by another technique), and result parties may assemble computation results received from one or more computing parties into the result of the distributed computation. In some embodiments, no computing party may have more than one part for an input, and no part by itself may provide enough information to derive the original input. In these or other embodiments, no party other than an input party may ever see the original inputs to the distributed computation.

Some embodiments that implement the disclosed SMCs may perform arithmetic or, preferably, Boolean operations, the latter being more efficient at pattern matching. Some embodiments may implement secret sharing. By this cryptographic operation, a piece of data is split into parts that by themselves do not give information about the original data. Some embodiments of garbled circuits component 134 of requester 130 may implement oblivious transfer, this cryptographic operation being a class of protocols for data transfer in which a sender sends one of several pieces of data but does not know which one. Some embodiments may implement homomorphic encryption, which is a class of schemes for producing ciphertexts upon which computations may be performed.

Some embodiments that implement the disclosed SMCs may use a trust model, such as self-trust or honest majority. In self-trust, a party assumes it can only trust itself. In an honest majority implementation of the trust model, a party must rely upon the majority of the parties being honest.

Disclosed embodiments may preferably implement the self-trust model due to only two parties being involved (e.g., a provider and requester pair or a provider and verification system pair). A property of disclosed embodiments may be that they are fault tolerant. That is, under a self-trust model, all parties are needed for a computation to proceed, and the system may fail if even one of the parties is unable or unwilling to participate. Whereas if a system merely relies on there being an honest majority, the system can proceed to completion even if some of the parties fail to carry out their duties.

Some embodiments may implement passive (e.g., semi-honest) security, active security, or, preferably, covert security. Implementations of passive security may guarantee that none of the parties to a computation learn anything besides the output of the computation, as long as all computing parties follow the protocol. In implementations of active security, none of the parties may learn anything besides the output of the computation (e.g., even in the presence of malicious parties who are willfully trying to deviate from the protocol). Covert security may be preferable in the disclosed embodiments because the system may be able to identify that a party has a 50% probability of being malicious and to take punitive measures (e.g., punishing by subtracting tokens and/or by publishing a proof of the cheating to the blockchain). Active security implementations perform worse than passive security. Covert security implementations may provide similar guarantees to active security, while performing better. Some embodiments may not use covert security, e.g., to hide matching intentions.

In some embodiments, user profiles are kept confidential client-side, e.g., by undergoing SMC.

In some embodiments, blockchain 40 may support one or more transactions. These transactions may include one or more of adding a commitment to the blockchain, adding a request (e.g., a survey or another request) to the blockchain, adding results of demographic criteria matching to the blockchain, adding results of provider-submitted response matching to the blockchain, transferring tokens to and from nodes, adding a specification that the request (e.g., the survey or the other request) is closed or otherwise fulfilled, expiring one or more of the matches, and retrieving encrypted data points. For example, when requester 130 generates a request (e.g., for a survey, royalty scheme, advertisement, or loyalty scheme) using requesting component 138, the requester may commit to paying a certain amount of tokens and may specify desired demographic value(s) and/or range(s). In some embodiments, provider 110 may be notified when a requester submitted desired demographics that match with the provider's demographics previously committed to (i.e., in the blockchain) or the provider may poll the smart contract for applicable requests.

In some embodiments, participants of the requested survey may be based on whether public criteria (e.g., demographics or other suitable criteria) of each interested provider 110 matches public criteria specified by requester 130. In these or other embodiments, participants of the survey may be based on whether answers provided by the provider to screening questions of the requester matches, i.e., to satisfy confidential criteria. For the public criteria matching, a zero-knowledge (ZK) proof may be performed between provider 110 and requester 130. Once a match is confirmed for the public criteria and/or confidential criteria, provider 110 may fulfill the request (e.g., complete a response to the survey or questionnaire) using created data points, encrypt the resultant data points created by the provider, and publish the encrypted data points to the blockchain. The publishing of the data points may, in some embodiments, only take place after the data points are validated by the smart contract along with the provider's committed-to demographic. The provider may receive some token value in response, effectively selling their data. The requester may then close out the request (i.e., once the requested data is extracted from the smart contract).

The smart contract may coordinate the SMC, which may break up the computation into two sub-computations and may assign a sub-computation to each of the requester and provider. Both the requester and provider may provide inputs to the computation. The resulting data points may be encrypted by the provider in response to the request. Inputs to this encryption may comprise a provider's data point(s), the provider's profile value(s), a requester's data format requirement, the requester's profile pattern requirement, and/or the requester's secret key. If the provider's profile value fits the requester's profile pattern and if the provider's data point(s) are provided in the required format, then an output may be an encrypted value using the key. The provider and requester may send the results of their sub-computations to a smart contract of system 10, which may assemble these sub-computations into a data point and simultaneously send payment to the provider. The requester may read (e.g., decrypt) the data point of the smart contract.

In some embodiments, a block (e.g., block 50, 60, or 70) in blockchain 40 may include a plurality of transactions collected via the blockchain from a plurality of nodes or client devices connected to system 10. In some embodiments, these transactions may include a timestamp and/or a digital signature of an intent to commit the transaction to the blockchain. These transactions may be commitment transactions, account transactions, survey additions, answers submissions, and accepted matching. Blockchain 40 on which the commitments reside may be the same as or different from a blockchain on which one or more of the other transactions are stored. Each block of a blockchain may, in some embodiments, contain a hash of the previous block (or a hash of that hash), thereby forming a chain. Just as transactions are added to a block in chronological order (e.g., in an order that they were broadcast from one node to other nodes), blocks in the blockchain are thus permanently added to the chain in chronological order.

Miners 190 may validate the transactions (e.g., redoing at least some of the computations that resulted in the transactions) such that the blockchain results in a self-auditing ecosystem. Miners may add the validated transactions to a block they are building and then may broadcast a completed block to other nodes so that all have a copy of the blockchain. The blockchain network thus reconciles every broadcast transaction in intervals. In some embodiments, a client device, miner, or other node that generated the block is rewarded a unit value and any change resulting from the transaction, the reward and change being usable with respect to blockchain 40. Miners 190 may thus generate blocks that comprise validated blockchain transactions.

FIG. 2 depicts an exemplary blockchain, in accordance with one or more embodiments. In some embodiments, data 58 of block 50 may comprise a sequential set of less recent commitments, account information, and/or other blockchain data values. In some embodiments, data 68 of block 60 may comprise a sequential set of more recent commitments and accounts and other blockchain data values. In some embodiments, data 78 of block 70 may comprise a sequential set of most recent commitments and accounts and other blockchain data values. In some embodiments, this data may comprise surveys, answers, and accepted matching. In one example, block 50 may be block n−1, block 60 may be block n, and thus block 70 may be block n+1, n being any natural number. The blocks may thus form an ordering. In some embodiments, block 50 may comprise current hash 52, previous hash 54, other header values 56, and/or data 58. Similarly, block 60 may comprise current hash 62, previous hash 64, other header values 66, and/or data 68. And block 70 may comprise current hash 72, previous hash 74, other header values 76, and/or data 78. In some embodiments, a different function from a hash function is used to generate values for the headers of a block (e.g., block 50, block 60, block 70, etc.) of blockchain 40.

A copy of the blockchain may be downloaded automatically upon joining the blockchain network. Once reconciled, the data embedded within the network is public (i.e., the tamper-resistant ledger is accessible by any user of the network). The blockchain data may not be corrupted, i.e., altering any unit of information would require use of an infeasible amount of computing power (e.g., to override at least 50% of the networked nodes).

The state of ledger may be determined by consensus among independently operated nodes, which form this network that interfaces with blockchain 40. For example, at least a portion of the data may be demonstrable as a valid reflection of a transaction via the blockchain; the demonstration may include a decryption function or a cryptographic hash.

In some embodiments, system 10 may only allow creation of one account from one identification (ID) document (e.g., driver's license, passport, employee badge, student ID, social security card, birth certificate, etc.). System 10 may, in these or other embodiments, allow at most one commitment per profile value. In some embodiments, profile data (including demographic information submitted for verification to verifier 150) may be stored on provider 110's local device. Providers 110 may thus maintain their own profile. Profile data may be used for population targeting, but system 10's implementation of SMC ensures that it will remain private. Some of the fields in the profile are fixed, such as sex and year of birth. Others may be mutable, such as household income and relationship status. Providers 110 may change the mutable fields, but each change may be logged in blockchain 40. Requesters 130 may use this information to avoid fraud. For example, requester 130 may want to avoid providers 110 who have changed their household income more than three times over the past three years. In some embodiments, requesters 130 that detect suspicious activity may flag that provider 110 in a two-sided rating system, for a fee (e.g., payable in tokens).

In some embodiments, a profile value or a group of profile values of each commitment may be any demographic value(s). Demographic values may include a gender, age, employment income, country of residence of the user, and/or other information identificatory or characteristic of the user. Each of the profile values may be a single value or may specify a range of values.

Each of electronic storage 122, 142, 162, and 182 of FIG. 1 may comprise electronic storage media that electronically stores information. The electronic storage media of electronic storage 122, 142, 162, and 182 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Each of electronic storage 122, 142, 162, and 182 may be (in whole or in part) a separate component within system 10 or provided (in whole or in part) integrally with one or more other components of system 10 (e.g., user interface device 126 of provider 110, processor 111, processor 131, processor 151, processor 171, etc.). In some embodiments, each of electronic storage 122, 142, 162, and 182 may be located in a server together with processors 111, 131, 151, and 171, respectively, in a server that is part of external resources 124, in user interface devices 126, and/or in other locations. Each of electronic storage 122, 142, 162, and 182 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Each of electronic storage 122, 142, 162, and 182 may store software algorithms, information obtained and/or determined by processors 111, 131, 151, and 171, respectively, information received via user interface devices 126 and/or other external computing systems, information received from external resources 124, and/or other information that enables system 10 to function as described herein.

External resources 124 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply, a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 124 may be provided by other components or resources included in system 10. Processor 111, external resources 124, user interface device 126, electronic storage 122, blockchain 40, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN)), cellular technology (e.g., GSM, UMTS, LTE, 5G, etc.), Wi-Fi technology, another wireless communications link (e.g., radio frequency (RF), microwave, infrared (IR), ultraviolet (UV), visible light, cmWave, mmWave, etc.)), a base station, and/or other resources.

User interface device(s) 126 of provider 110 may be configured to provide an interface between one or more users and system 10. User interface devices 126 are configured to provide information to and/or receive information from the one or more users. User interface devices 126 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 126 may include a plurality of separate interfaces associated with processors 111 and/or other components of system 10. Examples of interface devices suitable for inclusion in user interface device 126 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 126 include a removable storage interface. In this example, information may be loaded into user interface devices 126 from removable storage (e.g., a smart card, a flash drive, a removable disk) that enables users to customize the implementation of user interface devices 126.

In some embodiments, user interface devices 126 are configured to provide a user interface, processing capabilities, databases, and/or electronic storage to system 10. As such, user interface devices 126 may include processors 111, electronic storage 122, external resources 124, and/or other components of system 10. In some embodiments, user interface devices 126 are connected to a network (e.g., the Internet). In some embodiments, user interface devices 126 do not include processor 111, electronic storage 122, external resources 124, and/or other components of system 10, but instead communicate with these components via dedicated lines, a bus, a switch, network, or other communication means. The communication may be wireless or wired. In some embodiments, user interface devices 126 are laptops, desktop computers, smartphones, tablet computers, and/or other user interface devices.

Data and content may be exchanged between the various components of system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, each of processors 111, 131, 151, and 171 may belong to a user device, a consumer electronics device, a mobile phone, a smartphone, a personal data assistant, a digital tablet/pad computer, a wearable device, a personal computer, a laptop computer, a notebook computer, a work station, a server, a high performance computer (HPC), a vehicle computer, a game or entertainment system, a set-top-box or any other device. As such, each of processors 111, 131, 151, and 171 is configured to provide information processing capabilities in system 10. Each of processors 111, 131, 151, and 171 may comprise one or more of a digital processor, an analog processor, a digital circuit designed to process information, an analog circuit designed to process information, a state machine, and/or other mechanisms for electronically processing information. Although each of processors 111, 131, 151, and 171 is shown in FIG. 1 as a single entity, this is for illustrative purposes only. In some embodiments, each of processors 111, 131, 151, and 171 may comprise a plurality of processing units. These processing units may be physically located within the same device (e.g., a server), or each of processors 111, 131, 151, and 171 may represent processing functionality of a plurality of devices operating in coordination (e.g., one or more servers, user interface devices 126, devices that are part of external resources 124, respective electronic storage, and/or other devices).

As shown in FIG. 1, each of processors 111, 131, 151, and 171 is configured via machine-readable instructions to execute one or more computer program components. The computer program components of processor 111 may comprise one or more of blockchain component 112, SMC authentication component 114, SMC matching component 116, responding component 118, information component 119, and/or other components. The computer program components of processor 131 may comprise one or more of blockchain component 132, garbled circuits component 134, SMC matching component 136, requesting component 138, information component 139, and/or other components. The computer program components of processor 151 may comprise one or more of blockchain component 152, SMC authentication component 154, pre-processing component 156, information component 159, and/or other components. In some embodiments, processor(s) 171 of authenticator 170 may comprise an SMC authentication component. Each of processors 111, 131, 151, and 171 may be configured to execute its respective components by: software; hardware; firmware; some combination of software, hardware, and/or firmware; and/or other mechanisms for configuring processing capabilities on processors 111, 131, 151, and 171, respectively.

It should be appreciated that although components 112, 114, 116, 118, and 119 are illustrated in FIG. 1 as being co-located within a single processing unit, in embodiments in which processor 111 comprises multiple processing units, one or more of components 112, 114, 116, 118, and/or 119 may be located remotely from these other components. Similarly, although components 132, 134, 136, 138, and 139 are illustrated in FIG. 1 as being co-located within a single processing unit, in embodiments in which processor 131 comprises multiple processing units, one or more of components 132, 134, 136, 138, and/or 139 may be located remotely from these other components. And although components 152, 154, 156, and 159 are illustrated in FIG. 1 as being co-located within a single processing unit, in embodiments in which processor 151 comprises multiple processing units, one or more of components 152, 154, 156, and/or 159 may be located remotely from these other components. For example, in some embodiments, each of components 112, 114, 116, 118, 119, 132, 134, 136, 138, 139, 152, 154, 156, and/or 159 may comprise a separate and distinct set of processors. The description of the functionality provided by the different components 112, 114, 116, 118, 119, 132, 134, 136, 138, 139, 152, 154, 156, and 159 described below is for illustrative purposes, and is not intended to be limiting, as any of these components may provide more or less functionality than is described. For example, one or more of components 112, 114, 116, 118, 119, 132, 134, 136, 138, 139, 152, 154, 156, and/or 159 may be eliminated, and some or all of its functionality may be provided by other components. As another example, processor 111 may be configured to execute one or more additional components that may perform some or all of the functionality attributed below to one of components 112, 114, 116, 118, and/or 119. Similarly, processor 131 may be configured to execute one or more additional components that may perform some or all of the functionality attributed below to one of components 132, 134, 136, 138, and/or 139. And processor 151 may be configured to execute one or more additional components that may perform some or all of the functionality attributed below to one of components 152, 154, 156, and/or 159.

Disclosed embodiments may use SMCs to facilitate user authentication, profile matching, and/or data point validation. For example, some embodiments may perform authentication of provider 110 via an SMC that produces a digital proof of authenticity, certificate, or commitment, the SMC of this example being carried out by provider 110 and verifier 150 (and, in some instances, by authentication server 170 as well). This proof, certificate, or commitment may comprise provider 110's blockchain account name and basic demographic details, and, in some instances, it may be signed using the blockchain's signing mechanism by authenticator 170 (which may contribute its private key as an input to the computation that generates the signature or which may use a private key of verifier 150). In some embodiments, authenticator 170 may participate with provider 110 in obtaining a blockchain account. Authenticator 170 may be used for execution of smart contracts. Authenticator 170 may comprise processors 171 and storage 182.

In some implementations, the SMC may receive certain inputs that remain unknown to all participants of the computation other than the original owner of the input. These inputs may be provider 110's account name (which may be included in the commitment), demographic details provider 110 desires to include in this commitment, information related to verifier 150, and/or a private key of verifier 150 or authenticator 170 (which may be used to sign the commitment, certificate, or digital proof of authenticity). During this SMC, the identity of provider 110 may be verified, and demographic details of a user associated with this provider 110 may be cross-checked. If successful, the provider may receive a certificate useable to prove authenticity in future transactions. In some embodiments, the commitment or the digital proof of authenticity may function similarly as a TLS certificate. Using an SMC, system 10 allows each verified provider to subsequently provide some confidential information they hold, without disclosing it to any other party of the SMC. In some embodiments, more particularly those that involve a digital proof of authenticity, the computing parties may send intermediate results of sub-computations to provider 110 for assembling them into the digital proof of authenticity.

Some disclosed embodiments may use SMC to facilitate user authentication, e.g., via ZK proofs and commitments published to the blockchain. That is, certificates may not be necessary.

In some embodiments, providers 110 commit to a chosen value (or chosen statement) while keeping it hidden to others, with the ability to reveal the committed value (or statement) later. By the disclosed commitment scheme, a party cannot change the value or statement after they have committed to it (e.g., it may be binding). Interactions in the disclosed commitment scheme may take place in two phases: (i) the commit phase during which a value is chosen and specified and (ii) the reveal phase during which the value is revealed and checked. The value chosen during the commit phase may be the one that validates during the reveal phase.

User of provider 110 may select and provide, e.g., via user interface device 126, the profile value(s). Similarly, in some embodiments, user of provider 110 selects and provides, e.g., via user interface device 126, a random number. In other embodiments, the random number is not obtained externally but rather generated locally by a component of processors 111. In some embodiments, at least some of parameters 129 is known by both provider 110 and verifier 150. These parameters may include one or more of elliptic curve cryptography (ECC) points, digests, and random integers. In some embodiments, electronic storage 122 may comprise previously input (e.g., via user interface device 126) profile values, previously generated random numbers, parameters 129, and/or other stored values.

In some embodiments, a commitment or an intermediate commitment may be based on a name of provider 110 and a name of the profile value. The commitment may be a sequence of characters or bits that may be used to ensure that a particular profile value was that which was previously committed. As with any blockchain transaction, the sender of the transaction, in this case verifier 150, may be recorded in the transaction metadata.

Verifier 150 may be associated with one or more of a governmental organization, bank, title company, credit agency, employer, a company that performs background checks, or any other trusted institution or organization. The governmental organization may be a department of motor vehicles (DMV) or another agency of a branch of local, state, provincial, or national government. Verifier 150 may use security features embedded in an ID (e.g., a watermark) to verify the ID as part of or prior to the commitment publishing process. This verification process may be designed to confirm or authenticate a user's identity, effectively protecting against identity theft. The verification process may be undergone between provider 110 and one or more verification systems. In some embodiments, provider 110 may select the verification system(s). If provider 110 passes verification, one of the verification systems may then publish the commitment to the blockchain or issue a signed digital proof of authenticity, either of which may be accessible to requesters 130.

Commitments of disclosed embodiments may be verified by cross-checking to ensure that a profile value being committed to by provider 110 is consistent with the ID documentation. If provider 110 then becomes engaged with requester 130, a verification may take place to confirm that this profile value matches the commitment published to the blockchain. For example, a certain amount of time (e.g., n weeks, months, or years, n being a natural number) after the commitment is posted to the blockchain, a party of an SMC may show that a profile value input to the SMC, which is not presently disclosed to any other party, is consistent with a previously published commitment value. As such, a requester 130 of the SMC may be assured that this value has not changed during that certain amount of time and that it was verified by verifier 150, which validated the identification documentation and which verified the profile value as being accurate.

In some embodiments, SMC authentication component 114 of provider 110 generates a commitment or an intermediate commitment using parameter(s) 129 (e.g., generator "base" point G or another constant) and profile value(s) to which a user of provider 110 commits, the commitment or the intermediate commitment being combined with a secret random number or a manipulation of the secret random number (e.g., to generate an elliptic curve point). As a result of this combination, SMC authentication component 114 may generate the commitment that is subsequently published to blockchain 40, by blockchain component 152 of verifier 150 or by blockchain component 112 of provider 110. And this combination may initially comprise a function that manipulates the random number to generate a cryptographic value (e.g., an ECC point), which is then provided to SMC authentication component 154 of verifier 150 for verifying the combination. That is, the random number remains secret by not being provided by provider 110 in generating and posting the commitment. As such, provider 110 is able to control under which situations confirmation of profile values is possible and may even only participate in its exchange or confirmation for a certain amount tokens. Some embodiments of this first ZK proof or protocol may thus prevent another party from confirming that a profile value matches the publicly published commitment.

In some embodiments, pre-processing component 156 of verifier 150 may obtain and/or sense ID documentation 80. For example, this component of verifier 150 may obtain a scanned copy of this documentation and perform image recognition, an extraction, and/or optical character recognition (OCR) processing operations. In some embodiments, pre-processing component 156 may extract a profile value from ID documentation 80 provided by the provider. In some embodiments, electronic storage 162 may comprise sensed (e.g., via a sensor) documentation and other stored information. Information component 159 of processor 151 may subsequently obtain output results of this sensing in further processing (e.g., to generate or verify a commitment).

In some embodiments, SMC authentication component 154 of verifier 150 may perform a cryptographic function on a profile value extracted from ID documentation 80 associated with a user of provider 110. This function may be a one-way, deterministic function (e.g., a hash, such as SHA-256) or another implementation of a cryptographic algorithm, such as message digest (MD). SMC authentication component 154 may use a random number provided (e.g., only) by the provider or may use a manipulation of the random number, the manipulation being provided to this component to further obfuscate the output of the cryptographic function and thus to prevent brute force attacks. SMC authentication component 154 may thus obfuscate the profile value to be committed to blockchain 40 by any suitable operation (e.g., cryptographic, scalar multiplicative, or other suitable function) that use a key, constant, and/or randomly selected values. A commitment may be generated as a result of this obfuscation. The commitment may be generated by SMC authentication component 154 as a result of one or more operations or computations based on a commitment provided by provider 110. In some embodiments, SMC authentication component 154 may generate a commitment that is subsequently published to blockchain 40 by comparing the commitment (or intermediate commitment) generated locally with a commitment (or intermediate commitment) generated by provider 110 that is provided to verifier 150.

In some embodiments, requester 130 may direct a ZK proof to effectively verify that a commitment obtained from blockchain 40 has not changed value over some period of time. A ZK proof is a way to prove that a party knows a secret (e.g., that provider 110 has committed to being identified by one or more demographic values) and something related to that secret (e.g., a random value or a modification of the random value) without revealing the secret. For example, requester 130 may read the commitment from blockchain 40 and bring it through a ZK proof to prove that a profile value provided by provider 110 into a computation is the same as the commitment published to blockchain 40. In doing so, requester 130 may provide the commitment to an SMC, particularly, a verification computation. And provider 110 may provide a profile value to the computation, this value not being shared with requester 130. A ZK protocol or proof may then be performed to ensure that the profile value given to the computation is the same as the one previously committed to (e.g., unalterably stored in blockchain 40). This process may effectively operate as an authentication of provider 110. For example, requester 130 may accept (e.g., via this authentication) that one or more profile values provided (e.g., by a provider that may respond to the requester's query or request for information) are acceptable to its needs. Provider 110's identity may thus be validated in a protected fashion, i.e., without more overtly revealing an identity of a user of provider 110. In some embodiments, a known network transaction (e.g., a commitment to be recorded) is stored on devices of system 10 in encrypted form.

Both provider 110 and requester 130 may provide inputs to an SMC that the other party does not know. This leads to the potential of the provider providing junk data, which is why, in some embodiments, the SMC may include a match of the provider's input with a verification of a retrieved commitment. As such, a second ZK proof or protocol may be performed, in some embodiments between provider 110 and requester 130, that involves criteria matching. This protocol may comprise at least two determinations. A first may be, e.g., a determination as to whether a profile value provided by the provider satisfies one more criteria (e.g., supplied by requester 130). And a second may be, e.g., a determination as to whether the profile value is consistent with or corresponds to a commitment that was previously published (e.g., publicly to blockchain 40) with or by the provider. This commitment may be retrieved by requester 130, e.g., for input into the protocol. The profile value may be secret, confidential, or otherwise suitably classified. That is, in some embodiments, the profile value is considered sensitive and its confidentiality protected.

Controlling access to the profile value is difficult. One exemplary problem is that a provider can input into an SMC a different profile value but because the original profile value is never actually revealed to the requester, the requester would never know of the inauthenticity, i.e., a false commitment. Some embodiments may resolve this difficulty by providing an SMC via which a requester gains assurance that the value inputted to the SMC is that which was previously committed. It would not be prudent to check against its commitment, retrieved and inputted to the computation by the requester, in the SMC. This is not a practical solution because the performance would be poor. Instead of commitment validation, another function involving parameter 129 is evaluated as part of the SMC that, in conjunction with a subsequent ZK proof, makes it infeasible for the provider to use the different profile value. One way to structure the SMC is to use one or more garbled circuits.

System 10 may associate account names on blockchain 40 with accounts of applications that use a more traditional, centralized database-backed system and that have clients. In some embodiments, the blockchain is managed by its network of nodes. Blockchain 40 may give users or nodes connected to it an ability, via the network, to create value and authenticate digital information.

For authenticating a user, system 10 may securely store in the blockchain, among other transactions, demographic information and/or other, non-identifying information. In some embodiments, when a user updates (e.g., corrects, adds new information, or removes existing information) their profile, another commitment may be published to the blockchain. Some embodiments may incentivize providers, the providers being rewarded tokens for keeping their profiles up to date and for providing more information. For example, a 25-year-old woman living in Los Angeles USA may want to receive advertisements related to her political interests, so she may choose to keep the information that indicates she is a Republican. But she may not wish to receive surveys in relation to being a single mom, so she could delete that information.

In some embodiments, users who place their data into the blockchain and participate in market research (i.e., requests) may be rewarded with tokens. Holders of tokens may be able to place data requests or sell them to those seeking to do so.

As such, some embodiments of information component 119 of provider 110 and/or some embodiments of information component 139 of requester 130 may comprise functionality for tracking a number of tokens to which a respective user has rights. In some embodiments, the more certainty there is around a provider's authenticity (e.g., a plurality of trusted verification servers have vouched for the provider) and the more demographic details the provider provides the more the provider may be paid.

System 10 may perform cryptographically guaranteed computations on undisclosed, pre-committed values. For example, provider 110 may allow data under its possession to be used in a computation requested by requester 130, without disclosing the aforesaid data. The computation may be performed by provider 110 and requester 130 using a peer-to-peer protocol, that is, without the involvement of another party. System 10 may further include mechanisms to ensure that provider 110 is providing the agreed-upon data, while maintaining the confidentiality of the data.

Provider 110 may have a piece of data desired for committing, prior to being used in any computation. Doing so may ensure the data has not been altered, since the time of commitment. To do so, provider 110 may generate a random value, called an opening, and use a commitment scheme to generate a value called a commitment from the data and the opening. The opening is needed to verify the committed value with the commitment and may never be revealed so as to require provider 110's involvement in every commitment check; this may ensure that the data cannot be used without provider 110's consent, which is implied by the provider 110's voluntary involvement in the computation.

For publishing the commitment, provider 110 may send the data and the commitment to a trusted party, such as verifier 150 or an inspector. The opening may explicitly not be sent. Verifier 150 may cross-check the data against a trusted source, such as a passport. If the data checks out, provider 110 and verified 150 may use a zero-knowledge protocol to prove that provider 110 has knowledge of the opening for the commitment, which may imply that the data checks out against the commitment; the opening may not be disclosed as part of this process. Upon success, verifier 150 may publish the commitment to a trusted public ledger, such as blockchain 40.

The commitment may be generated using elliptic curve scalar multiplication. Due to the discrete logarithm problem, it may be infeasible for provider 110 to come up with the opening for a value other than the one committed that would pass a commitment check for the published commitment.

Provider 110 and requester 130 may use a two-phase commit protocol (2PC) protocol to perform a computation. In a 2PC protocol, two parties may be able to provide inputs to a computation performed amongst themselves, that is, without a third party, without disclosing what the inputs are to the other party. Provider 110 may input the pre-committed data to the computation.

In this process, provider 110's input may never be disclosed to requester 130, so system 10 may provide some other way to provide assurance to requester 130 that the value inputted by provider 110 is the committed value. Provider 110 and requester 130 may use a zero-knowledge protocol to prove that provider 110 knows the opening for the commitment and the data inputted to the 2PC, the opening not being revealed during this process. To avoid tampering by the provider 110, requester 130 may be responsible for retrieving the commitment from the trusted ledger and inputting it to the protocol.

If an opening were not needed, then the inspector would be able to bypass provider 110 and undergo this process with a requester.

It may be infeasible for requester 130 to reverse-engineer the committed value from just the commitment. Even if the discrete logarithm problem were feasible, requester 130 may only be able to determine the product of the committed value and the opening, which may not give information about what the committed value is.

System 10 may assume that provider 110 is trusted to send agreed-upon data but that requester 130 is untrustworthy, who may accept agreed-upon data without paying for it.

The disclosed smart contract may facilitate the exchange. As part of the setup, requester 130 may send tokens to the data exchange, which are held in escrow. If requester 130 approves provider 110 to receive a certain number of tokens in exchange for data of a specific length, it may indicate this to the data exchange, which may allocate the agreed-upon number of tokens to provider 110 for a fixed period of time. Requester 130 may also generate a one-time password (OTP) and send it to provider 110. Provider 110 may encrypt the data with the OTP and send the ciphertext to the data exchange, which may trigger the data exchange to transfer the allocated tokens to provider 110's account.

Once something has been published to a public blockchain, there are strong safeguards in place to prevent it from being tampered with, but it is also made publicly available for anyone to view. There is a lot of data that needs to be tamper-proofed but is too sensitive to be made publicly available. System 10 may, instead of publishing the data itself to blockchain 40, publish the commitment. Once published, there may be strong guarantees that the commitment is not tampered with; consequently, commitments that are retrievable from blockchain 40 may be used with high confidence to ensure a value is that which was previously committed. System 10 may prevent data tampering, while at the same time promoting its confidentiality by publishing a commitment of it to blockchain 40. In a typical 2PC, two parties provide inputs to a computation without disclosing them to the other party. This promotes confidentiality of the inputs, but it prevents the other party from checking the inputs of the other party to ensure it is the agreed-upon input. System 10 may obtain pre-validated and pre-committed inputs before being used in any computation. Computations may also be enhanced to provide assurance that, even though inputs are never disclosed, they are inputs that were previously validated and/or committed.

System 10 may guarantee about the inputs to a 2PC (or an MPC for the matter) by enhancing the protocol to include commitment checking. In a typical commitment scheme, anyone who possesses the committed value is able to pass a commitment check. This removes the need for the data owner from the commitment check process, which removes the need for his consent for the data to be used. The committed value in system 10 may alone be insufficient to pass a commitment check. An opening may also be needed. And the opening may never be disclosed to any other party. System 10 may use possession of an opening to enforce the need for consent to use data.

System 10 may use a smart contract to facilitate the exchange of confidential data. It is not an option to publish the data to the smart contract or even encrypted using a standard technique. Data that is published to a blockchain should be assumed to be public forever, and if a standard encryption technique is used, the original data would be recoverable with enough time and computational resources. System 10 may use OTP as the encryption system. The ciphertext that is produced by this system may not contain enough information to recover the original message, so the original message may be unrecoverable without the OTP, even with unlimited time and computational resources. This makes OTP suitable for use with a blockchain.

Typically, data that is published to a blockchain cannot be deleted. System 10 may facilitate deletes by publishing OTP-encrypted data to blockchain 40. Since ciphertext produced by OTP does not contain enough information to recover the original data, deleting the data from the blockchain is simply a matter of deleting the OTP.

Figure 3:
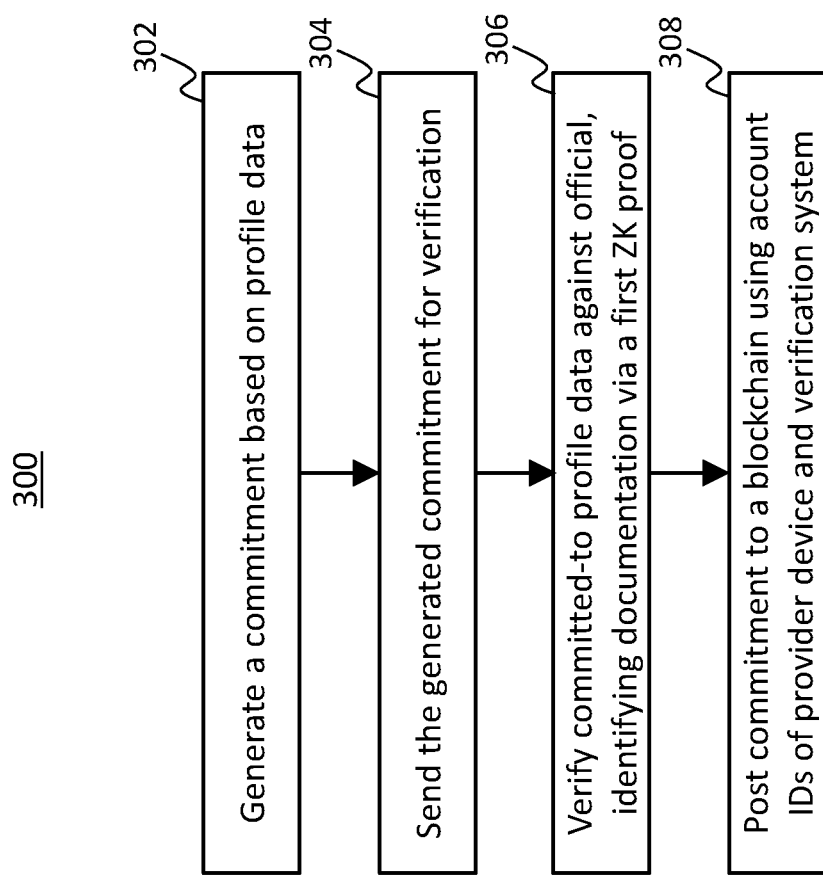
FIG. 3 illustrates a method for generating and posting commitments to a blockchain, in accordance with one or more embodiments.
Figure 4:
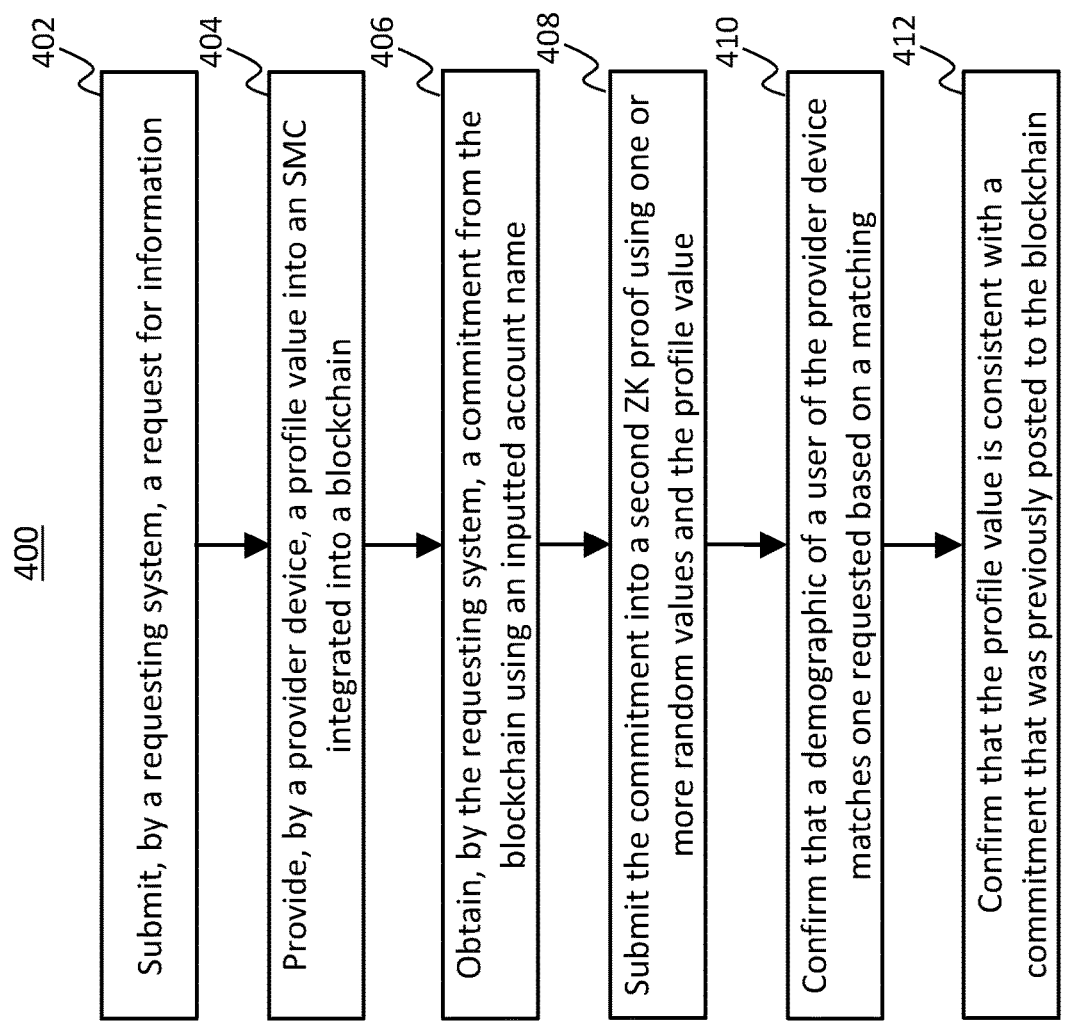
FIG. 4 illustrates a method for using the blockchain to process a request for information, in accordance with one or more embodiments.

FIGS. 3-4 illustrate methods 300 and 400, respectively, for generating and confirming blockchain commitments, in accordance with one or more embodiments. Methods 300 and 400 may each be performed with a computer system comprising one or more computer processors and/or other components. The processors are configured by machine readable instructions to execute computer program components. The operations of methods 300 and 400 presented below are intended to be illustrative. In some embodiments, methods 300 and 400 may be accomplished with one or more additional operations not described, and/or without one or more of the operations discussed. Additionally, the order in which the operations of methods 300 and 400 are illustrated in FIGS. 3-4 and described below is not intended to be limiting. In some embodiments, each of methods 300 and 400 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of methods 300 and 400 in response to instructions stored electronically on an electronic storage medium. The processing devices may include one or more devices configured through hardware, firmware, and/or software to be specifically designed for execution of one or more of the operations of methods 300 and 400.

At operation 302 of method 300, a commitment or an intermediate commitment may be generated based on profile data. In some embodiments, operation 302 is performed by a processor component the same as or similar to SMC authentication component 114 (shown in FIG. 1 and described herein).

At operation 304 of method 300, the generated commitment may be sent for verification. As an example, the commitment and any other values may be transmitted (e.g., via any suitable means or network, such as the Internet) from provider 110 to verifier 150. In some embodiments, operation 304 is performed by a processor component the same as or similar to information component 119 (shown in FIG. 1 and described herein).

At operation 306 of method 300, the committed-to profile data may be verified against official, identifying documentation via a first ZK proof. As an example, verifier 150 may validate an identity of a user of provider 110. For additional security and assurances, another verification device or system may re-verify the posted commitment by posting a value on the blockchain that indicates that the identification document is authentic. In some embodiments, operation 306 is performed by a processor component the same as or similar to SMC authentication component 154, pre-processing component 156, and/or information component 159 (shown in FIG. 1 and described herein).

At operation 308 of method 300, a commitment may be posted to a blockchain using account IDs of a provider device and a verification system. As an example, verifier 150 may use a smart contract and a blockchain account name of provider 110, to publish the commitment to blockchain 40. In some embodiments, a commitment is stored in a state of the smart contract. In some embodiments, when verifier 150 posts the commitment to blockchain 40, the account names of both provider 110 and verifier 150 may be added in association with the commitment. In some embodiments, operation 308 is performed by a processor component the same as or similar to blockchain component 152 (shown in FIG. 1 and described herein).

At operation 402 of method 400, a request for information may be submitted by a requesting system. As an example, requester 130 may publish a request for providers to fill out a survey to blockchain 40. In some embodiments, operation 402 is performed by a processor component the same as or similar to requesting component 138 (shown in FIG. 1 and described herein).

At operation 404 of method 400, a profile value may be provided, by a provider device, to an SMC integrated into a blockchain. As an example, a ZK protocol or proof may be performed to prove that the submitted profile value was that which was previously committed. In some embodiments, operation 404 is performed by a processor component the same as or similar to information component 119 (shown in FIG. 1 and described herein).

At operation 406 of method 400, a commitment may be obtained by the requesting system from the blockchain using an inputted account name. As an example, a provider's account name may be used to query the smart contract to retrieve a particular commitment from blockchain 40. In some embodiments, operation 406 is performed by a processor component the same as or similar to blockchain component 132 (shown in FIG. 1 and described herein).

At operation 408 of method 400, the commitment may be submitted to a second ZK proof using one or more random values and the profile value. As an example, the requester may perform a majority of the computational work so that the provider's device is not overloaded. The protocol may work by proving an equality that holds only if previous conditions are true. In some embodiments, operation 408 is performed by a processor component the same as or similar to SMC matching component 136 and/or information component 139 (shown in FIG. 1 and described herein).

At operation 410 of method 400, a demographic of a user of the provider device may be confirmed to match the one requested by the requesting system. As an example, one or more criteria may be matched. More particularly, provider 110 and requester 130 may compute two things: 1) whether a value a provided by the provider meets a criterion provided by the requester; and 2) whether this value is consistent with a commitment that was previously published publicly and retrieved by the requester for input into the protocol. In some embodiments, operation 410 is performed by a processor component the same as or similar to SMC matching component 136 (shown in FIG. 1 and described herein).

At operation 412 of method 400, the profile value may be confirmed to be consistent with a commitment that was previously posted to the blockchain. In some embodiments, operation 412 is performed by a processor component the same as or similar to SMC matching component 136 (shown in FIG. 1 and described herein).

FIG. 5 depicts a sequence diagram of operations performed by provider 110, verifier 150, blockchain 40, and requester 130. Provider 110 may transmit demographic value(s), cryptographic parameters, and/or a commitment to verifier 150. Verifier 150 may, in response, confirm (e.g., via a ZK proof or protocol performed between provider 110 and verifier 150) that the commitment properly represents the committed-to demographic value(s). Verifier 150 may then publish this commitment to blockchain 40, which may be used to broadcast this commitment to one or more nodes of the blockchain. After this commitment has been added to the blockchain, e.g., via mining activity, requester 130 may then publish a request to blockchain 40. A notification may then be sent to provider 110 if there is a potential match of criteria submitted as part of the request. Provider 110 may respond to the request. For example, responding component 118 of provider 110 may fill out at least a portion of a questionnaire provided by requester 130. Requester 130 may obtain a commitment from blockchain 40 and perform a protocol or proof (e.g., between provider 110 and requester 130) to confirm that the response is from a provider that satisfies the criteria and that the commitment pertains to this provider. A smart contract may be used to analyze the response and then, upon confirmation that it is properly completed, may forward the response to requester 130. In some embodiments, only requester 130 may be able decrypt the data they have purchased.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations are contemplated and within the purview of the appended claims.

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A computer-implemented method for collecting surveys with a secure identity, the method comprising:
    posting, from a requesting system to a blockchain, a request (i) pertaining to a survey and (ii) targeted to an attribute of a user;
    determining, via the blockchain, that a user profile includes an attribute that matches with the attribute of the request;
    transmitting, via the blockchain and in response to determining that the user profile includes the attribute that matches with the attribute of the request, the request to a device associated with the user profile;
    receiving, from the device associated with the user profile, a response to the request;
    generating, to the blockchain, a commitment based on the response to the request; and
    transmitting, from the blockchain to the requesting system, the commitment.

2. The method of claim 1, wherein determining that the user profile includes the attribute that matches with the attribute of the request comprises performing, between the device associated with the user profile and the requesting system, a zero-knowledge (ZK) proof.

3. The method of claim 2, wherein the ZK proof is a zero-knowledge succinct non-interactive argument of knowledge (ZKSNARK).

4. The method of claim 1, wherein the request is targeted to a plurality of attributes of the user, and wherein determining that the user profile includes the attribute that matches with the attribute of the request comprises determining that the user profile includes a plurality of attributes that match with the plurality of attributes of the request.

5. The method of claim 1, further comprising:
    determining that the response is properly completed; and
    holding the response in a smart contract associated with the blockchain.

6. The method of claim 5, wherein the request includes an amount of tokens to be held in escrow, the method further comprising:
paying, in response to determining that the response is properly completed, the amount of tokens to a user associated with the user profile.

7. The method of claim 5, further comprising:
transmitting, in response to determining that the response is properly completed, the properly completed response held within the smart contract to the requesting system.

8. The method of claim 1, further comprising:
receiving additional user profile information; and
paying, in response to receiving the additional user profile information, an amount of tokens to a user associated with the user profile.

9. The method of claim 1, further comprising:
adding, to the blockchain, results of the matching of the attribute between the user profile and the request.

10. The method of claim 1, wherein posting the request comprises adding a transaction to the blockchain in sequence with other data broadcasted during a contemporary time window.

11. The method of claim 10, wherein adding the transaction to the blockchain in sequence with other data broadcasted during the contemporary time window comprises adding the transaction to a new block or to an existing block of the blockchain.

12. The method of claim 1, wherein the blockchain is a tamper-resistant ledger comprising a chronological ordering of a plurality of blocks.

13. The method of claim 1, wherein the commitment is generated using an elliptic curve scalar multiplication.

14. A system comprising one or more processors and storage media storing instructions which, when executed by the one or more processors, cause:
posting, from a requesting system to a blockchain, a request (i) pertaining to a survey and (ii) targeted to an attribute of a user;
determining, via the blockchain, that a user profile includes an attribute that matches with the attribute of the request;
transmitting, via the blockchain and in response to determining that the user profile includes the attribute that matches with the attribute of the request, the request to a device associated with the user profile;
receiving, from the device associated with the user profile, a response to the request;
generating, to the blockchain, a commitment based on the response to the request; and
transmitting, from the blockchain to the requesting system, the commitment.

15. The system of claim 14, wherein the instructions when executed cause determining that the user profile includes the attribute that matches with the attribute of the request by performing, between the device associated with the user profile and the requesting system, a zero-knowledge (ZK) proof.

16. The system of claim 15, wherein the ZK proof is a zero-knowledge succinct non-interactive argument of knowledge (ZKSNARK).

17. The system of claim 14, wherein the request is targeted to a plurality of attributes of the user, and wherein the instructions when executed cause determining that the user profile includes the attribute that matches with the attribute of the request by determining that the user profile includes a plurality of attributes that match with the plurality of attributes of the request.

18. The system of claim 14, wherein the storage media stores further instructions which when executed cause:
determining that the response is properly completed; and
holding the response in a smart contract associated with the blockchain.

19. The system of claim 17, wherein the request includes an amount of tokens to be held in escrow, and the storage media stores further instructions which when executed cause paying, in response to determining that the response is properly completed, the amount of tokens to a user associated with the user profile.

20. The system of claim 14, wherein the storage media stores further instructions which when executed cause:
receiving additional user profile information; and
paying, in response to receiving the additional user profile information, an amount of tokens to a user associated with the user profile.

21. The system of claim 14, wherein the storage media stores further instructions which when executed cause adding, to the blockchain, results of the matching the attribute between the user profile and the request.

* * * * *